Jan. 5, 1965 E. L. HEINRICH 3,164,838
PANNING AND TILTING MOUNT FOR A CAMERA
Filed Sept. 28, 1961 4 Sheets-Sheet 1
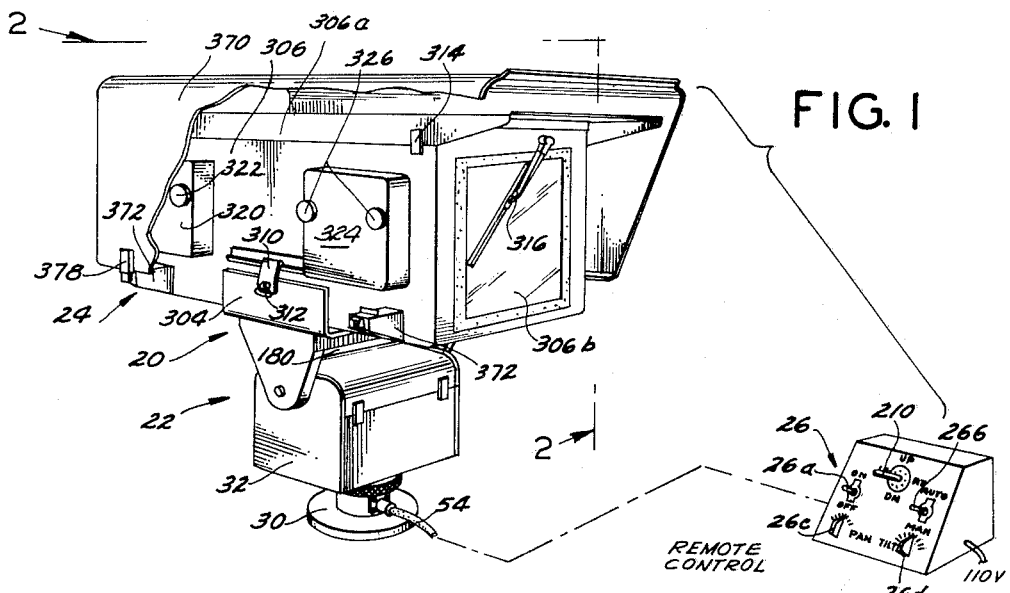
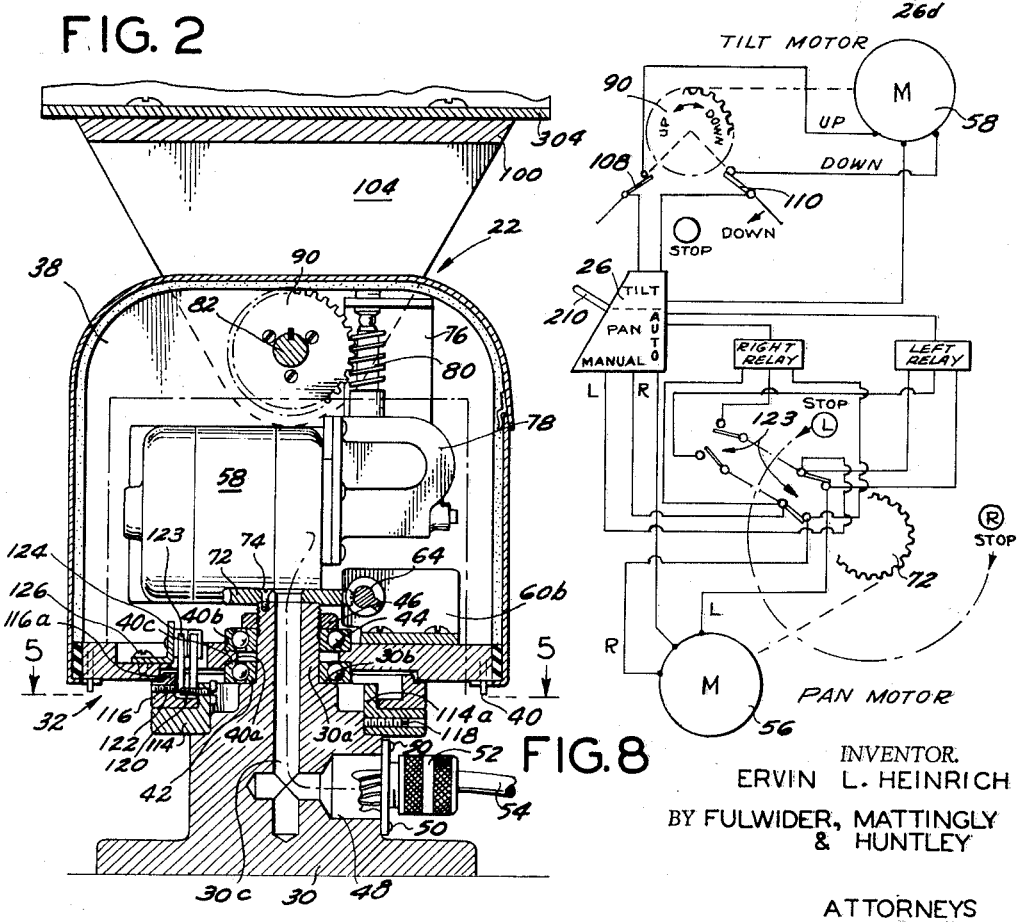
INVENTOR.
ERVIN L. HEINRICH
BY FULWIDER, MATTINGLY
& HUNTLEY
ATTORNEYS Jan. 5, 1965  E. L. HEINRICH  3,164,838
PANNING AND TILTING MOUNT FOR A CAMERA
Filed Sept. 28, 1961  4 Sheets-Sheet 2
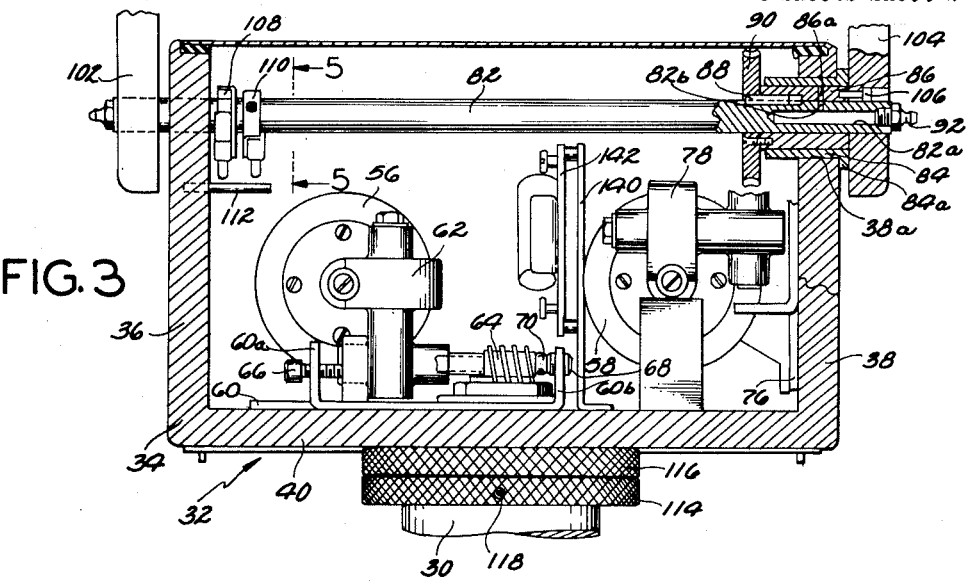
FIG. 3
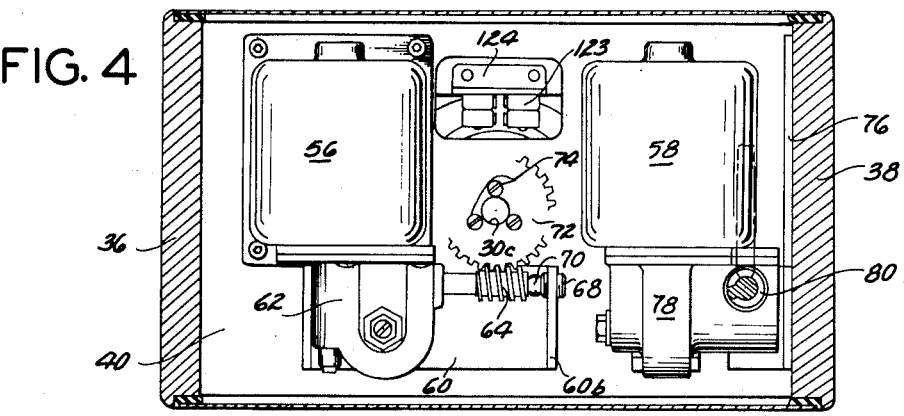
FIG. 4
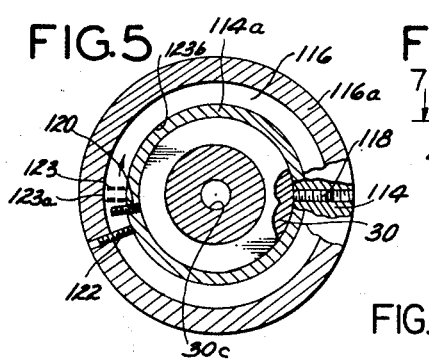
FIG. 5
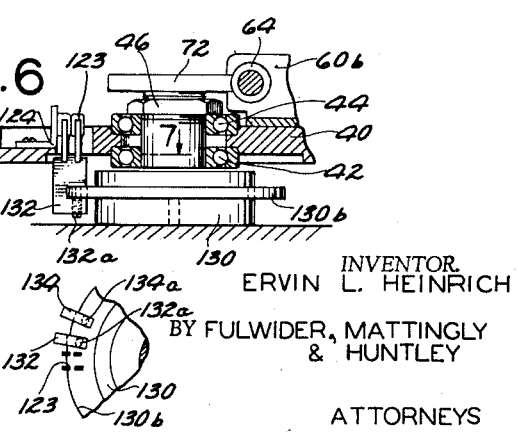
FIG. 6
FIG. 7
INVENTOR.
ERVIN L. HEINRICH
BY FULWIDER, MATTINGLY
& HUNTLEY
ATTORNEYS Jan. 5, 1965     E. L. HEINRICH     3,164,838
PANNING AND TILTING MOUNT FOR A CAMERA
Filed Sept. 28, 1961     4 Sheets-Sheet 3
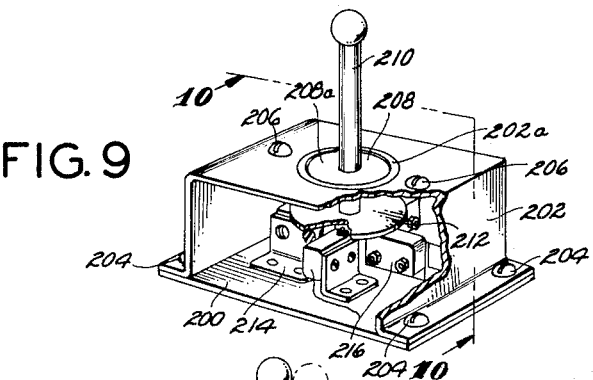
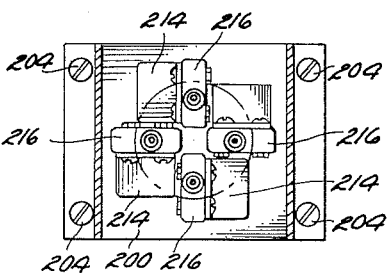
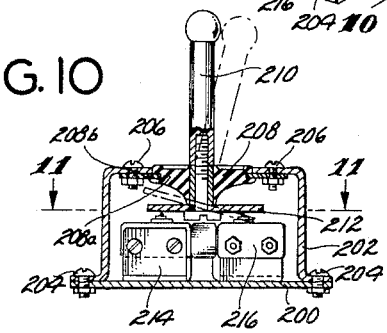
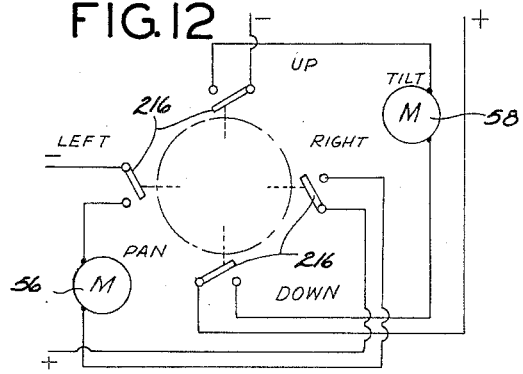
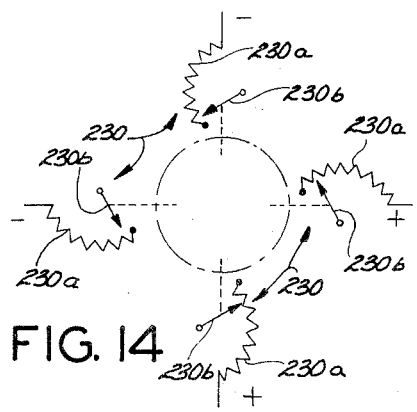
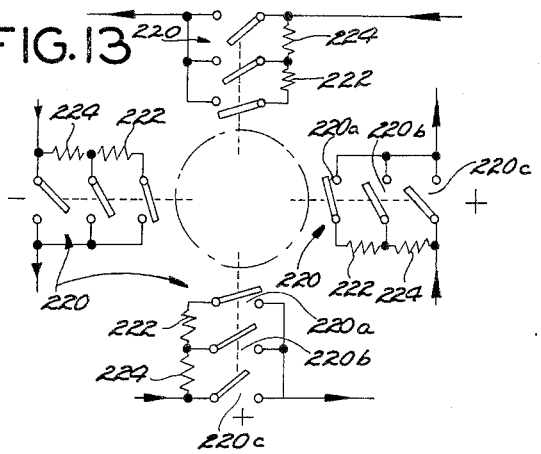
INVENTOR.
ERVIN L. HEINRICH
BY FULWIDER, MATTINGLY & HUNTLEY
ATTORNEYS Jan. 5, 1965  E. L. HEINRICH  3,164,838
PANNING AND TILTING MOUNT FOR A CAMERA
Filed Sept. 28, 1961  4 Sheets-Sheet 4

INVENTOR.
ELVIN L. HEINRICH
BY FULWIDER, MATTINGLY
& HUNTLEY

ATTORNEYS

United States Patent Office 3,164,838
Patented Jan. 5, 1965

3,164,838
PANNING AND TILTING MOUNT FOR A CAMERA
Ervin L. Heinrich, 4506 Paseo De Las Tortugas,
Torrance, Calif.
Filed Sept. 28, 1961, Ser. No. 141,350
3 Claims. (Cl. 352—69)

This invention relates generally to scanning apparatus but more particularly to visual scanning devices which can be remotely operated.

Due to the many complex facets of our present day society, there exists a need for automatic equipment which is capable of scanning a given area and relaying appropriate information to a given central location. That is, whereas heretofore suitably trained personnel were used for supervising persons or their activities, it has become desirable to use automatic equipment for such tasks. This is particularly true with regard to problems of security, it being desirable to employ automatic equipment not subject to human frailties for providing constant surveillance of a given place or group of persons.

Also, today's society is so fraught with scientifically complex devices and requirements, that frequently it is impossible to locate a person at a particular vantage point from which the desired scanning is to take place. More specifically, what with the advent of missiles and the like, for obvious reasons it is frequently desirable to perform visual scanning operations in outer space at locations which heretofore have not been visited by human beings from our planet.

Generally, the above explained objectives can be accomplished by employing television cameras which automatically scan a given area and relay such information back to a central location. Accordingly, it is an object of the present invention to provide visual scanning apparatus which can be located remotely and which will be capable of sending information back to a given location.

Another object of this invention is to provide scanning apparatus which includes automatic control means for continuously scanning a given area in a predetermined sequence.

Another object of this invention is to provide scanning apparatus which can be operated from a central location for control of all of the scanning motions of the remotely located apparatus.

Another object of this invention is to provide visual scanning apparatus as characterized above which can be adjusted to automatically pan back and forth for any angle of rotation up to 350 degrees.

Another object of this invention is to provide visual scanning apparatus as characterized above which includes means for tilting the apparatus through any desired angle of rotation up to 90 degrees.

Another object of this invention is to provide scanning apparatus as characterized above which is so constructed as to be operable under substantially all environmental conditions.

A more specific object of this invention is to provide remotely locatable visual scanning apparatus having a substantially weatherproof housing for operation of such apparatus under varying weather conditions.

Another object of this invention is to provide visual scanning apparatus as characterized above which is explosion proof for operation in areas of high physical impact.

Another object of this invention is to provide visual scanning apparatus which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a perspective view of one form of remotely operable scanning apparatus according to the present invention;

FIGURE 2 is a fragmentary sectional view of the pan and tilt head of FIGURE 1 taken substantially along line 2—2 thereof;

FIGURE 3 is a fragmentary front view of the pan and tilt head of FIGURE 1;

FIGURE 4 is a sectional top view of the pan and tilt head of FIGURE 3;

FIGURE 5 is a sectional view taken substantially along line 5—5 of FIGURE 2;

FIGURE 6 is a fragmentary sectional view of a second embodiment of pivotal mounting means for a pan and tilt head according to the present invention;

FIGURE 7 is a fragmentary sectional view taken substantially along line 7—7 of FIGURE 6;

FIGURE 8 is a schematic wiring diagram of the control means for the pan and tilt head;

FIGURE 9 is a fragmentary perspective view of control means for remote operation of the pan and tilt head;

FIGURE 10 is a sectional view taken substantially along plane 10—10 of FIGURE 9;

FIGURE 11 is a sectional view taken substantially along line 11—11 of FIGURE 10;

FIGURE 12 is a schematic diagram of the manually operable control means for the pan and tilt head;

FIGURE 13 is a schematic diagram of a second embodiment of such remotely operable control means;

FIGURE 14 is a third embodiment of such remotely operable control means;

Like reference characters indicate corresponding parts throughout the several views of the drawings.

Figure 15:
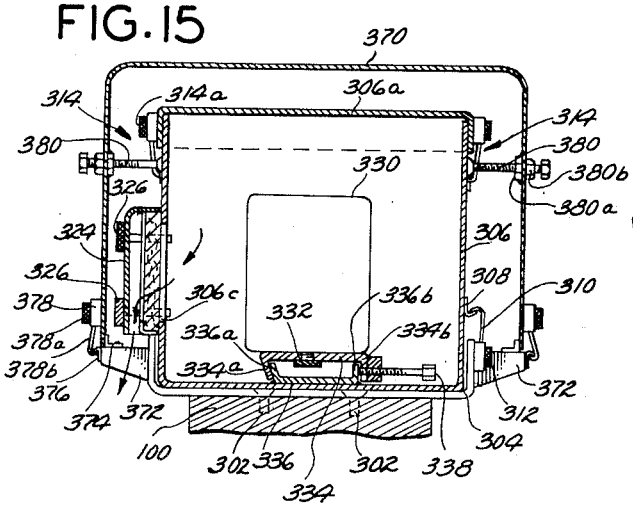
FIGURE 15 is a sectional view through the housing of the apparatus of FIGURE 1.

Referring to FIGURE 1 of the drawings, there is shown therein a preferred form of the present invention. It comprises a scanning unit 20 having a pan and tilt head 22 and a camera housing 24 mounted thereon. Also included in FIGURE 1 is a control device 26 for operation of such apparatus from a location remote therefrom.

As shown most clearly in FIGURE 2, pan and tilt head 22 comprises a stationary pedestal or base member 30 which rotatably carries a motor housing 32 on which is mounted a tiltable platform. Motor housing 32 comprises a generally U-shaped base member 34 which is shown most clearly in FIGURE 3 as having a pair of upstanding end portions 36 and 38 connected by a horizontal mounting platform 40. Platform 40 is formed with a central through opening 40a provided with an upper annular cutout or recess 40b and a lower annular cutout 40c. A lower bearing member 42 is positioned within annular cutout 40c whereas an upper bearing member 44 is similarly positioned within cutout 40b. The inner races of bearing members 42 and 44 snugly fit on the reduced end portion 30a of the base member 30, the bearing member 42 being seated against an annular shoulder 30b. End portion 30a is formed with external fastening threads for threadedly receiving a nut 46 for holding motor housing 32 in its assembled rotatable position on base 30.

Base member 30 is further formed with a through opening 30c, the lower end of which is adapted to receive a terminal connector 48 which is held in place by screws 50. Terminal connector 48 is formed with external screw threads for receiving a suitable connector 52 which is attached to one end of a cable 54 leading from control unit 26.

A series of lead wires extend from terminal connector 48 through opening 30c of base member 30 for connection with various electrical components within motor housing 32.

Within housing 32 are a pair of $\frac{1}{38}$ horsepower shunt wound D.C. motors 56 and 58 which, as will hereinafter be explained in greater detail, provide the motivating force for the panning and tilting functions respectively. Motor 56 is mounted on a suitable panel 60 whereon is adjustably positioned a speed reduction unit 62 for motor 56, the output of unit 62 being connected to a worm gear 64. Mounting panel 60 is provided with upturned portions 60a and 60b, the first of which carries an adjusting screw 66 which adjustably engages speed reduction unit 62, while the second carries an adjustable positioning stud 68 for worm gear 64. A friction reducing connection is provided between the end of worm gear 64 and stud 68 by means of a steel ball 70.

As shown in FIGURES 2, 3 and 4, worm gear 64 is horizontally disposed for cooperation with a suitable gear member 72 which is non-rotatably mounted on end portion 30a of base 30 by means of three fastening screws 74. Due to this arrangement, as worm gear 64 is caused to rotate, the entire motor housing 32 is thereby rotated due to the cooperation between such worm gear 64 and the stationary gear 72.

In similar fashion, motor 58 is mounted on a mounting panel 76 on the inner surface of end member 38 of base member 34. The output of motor 58 is reduced by means of a speed reduction unit 78, the output of the latter being connected to a vertically disposed worm gear 80.

A horizontally disposed pivotal shaft 82 extends from one end of motor housing 32 to the other. To facilitate this, end portion 38 of motor housing 32 is formed with an opening 38a wherein is press fitted a bushing 84 having an annular flange 84a which abuts against the outer surface of end wall 38. Within stationary bushing 84 is a rotatable bushing 86 which is fastened to shaft 82 by means of a fastening key 88 within suitably formed keyways in said members. Bushing 86 is snugly positioned within stationary bushing 84 for rotation therewithin, as will hereinafter appear. A suitable gear member 90 for cooperation with worm gear 80 driven by motor 58 is positioned relative to shaft 82 by means of the aforementioned fastening key 88 which also fits within a suitably formed keyway in gear 90. Also, there are provided three screws which extend through appropriate openings in gear member 90 and threadedly engage rotatable bushing 86. Due to this construction, gear 90 and shaft 82 operate as a unitary structure as will hereinafter become more apparent.

For lubricating the bearing surfaces of bushings 84 and 86, shaft 82 is formed with an axial opening 82a the outer end of which is formed with threads for receiving a grease fitting 92. In communication with axial opening 82a is a lateral opening 82b found in shaft 82 and a lateral opening 86a found in rotatable bushing 86. Openings 82b and 86a are so found as to be in alignment when the bushing 86 is firmly mounted on shaft 82 by fastening key 88.

The other end of rotatable shaft 82 extends through a suitable opening in end wall 36 of housing platform 34, and suitable wear bushings may be employed therebetween if desired. As shown in the drawings, it is also preferable to have this end of shaft 82 formed with an axial grease opening and provided with a grease fitting to facilitate lubrication of the rotatable mounting.

Mounted on the opposite ends of pivotal shaft 82 is the tiltable platform 100 having a pair of triangularly shaped opposite end members 102 and 104 which straddle the entire motor housing. End member 104 is rigidly fastened to rotatable bearing member 86 by screws 106. Thus, platform 100 is rigidly fixed relative to shaft 82 and gear member 90 for pivotal movement therewith under the influence of motor 58 as will hereinafter be explained in greater detail.

For controlling the extent of pivotal movement of platform 100 there is mounted on shaft 82 within motor housing 32 a pair of electrical limit switches 108 and 110 each of which is connected in the energizing circuit of motor 58 and is engageable with a pin 112 which is firmly fastened to end wall 36 of housing 32. That is, as will be more readily apparent from the explanation of the operation of the scanning apparatus, as the platform 100 is tilted in one direction, ultimately one of the limit switches 108 and 110 is caused to engage pin 112 for actuation to effectively stop the action of motor 58. Conversely, when such motor tilts platform 100 in the other direction, the other of such limit switches ultimately engages pin 112 to thereby stop motor 58. In this manner it is possible to restrict the tilting movement of platform 100 within predetermined safe limits.

For control of the panning movement of motor housing 32, there is provided a pair of relatively movable rings 114 and 116 on base member 30. Ring 114 is positioned on a shoulder formed in base 30 and is fastened relative thereto by a set screw 118. Ring 114 is formed with an annular upstanding shoulder 114a which is provided with a radial opening which is threaded for receiving a screw 120.

Upper ring 116 is rotatably mounted about shoulder 114a of ring 114 and is formed with an outer peripheral flange 116a having a radially disposed threaded opening for receiving a set screw extending inwardly for engagement with the outer surface of annular flange 114a. Due to this construction, and as will hereinafter become more apparent, set screw 122 is operable to retain rings 114 and 116 in predetermined angularly disposed relative positions, and also constitutes one of a pair of limit stop members. As shown most clearly in FIGURE 5 of the drawings, screws 120 and 122 are alternatively engageable at predetermined panning limits by electrical switch means 123 which is movable with housing 32 and is operable to control energization of motor 56. Such switch means is shown in FIGURE 2 as connected to an L-shaped bracket 124 which, in turn, is mounted by means of screw 126 within a recess formed in platform 40. Due to this arrangement, switch means 123 is movable with housing 23 into and out of engagement with limit stops 120 and 122. FIGURE 5 shows several sets of contacts 123a and 123b which are engageable with limit stops 120 and 122 to apply a predetermined voltage to the armature of motor 56 to effect dynamic braking of the panning movement of housing 32. Also, the direction of the voltage applied to the armature of the motors 56 and 58 determinates the direction of rotation thereof and under conditions of automatic panning can be controlled by switch means 123.

FIGURE 6 shows an alternative structural embodiment for controlling the limits of panning movement of the motor housing. This embodiment comprises a base member 130 which differs from the base member 30 of the above-described embodiment of FIGURE 2. Base member 130 comprises a threaded upper end portion 130a which receives the bearing members 42 and 44 and the retaining nut 46 as above described with respect to the other embodiment. However, base member 130 is formed with a substantially coplanar annular flange 130b on which is mounted, as best shown in FIGURE 7, a pair of limit stop members 132 and 134, each of which includes a set screw as shown at 132a and 134a. Limit stop members 132 and 134 are stationary and hence are engaged by switch means 123 during movement of housing 32 as above explained with respect to the other embodiment.

Mounted between electrical motors 56 and 58 within motor housing 32 is a bracket 140 carrying a circuit board 142 on which is mounted the various capacitors and other circuit components necessary for starting, stopping and running the D.C. motors in a manner well understood in the art. Due to the common understanding of such circuit arrangements, the details thereof will not be explained at this time, it merely being necessary for successful practice of this invention to realize that operation of limit switches 108 and 110 on shaft 82 controls the extent of tilting movement of platform 100, whereas operation of limit switch 123 controls the extent of panning movement of the entire motor housing 32.

For further control of the operation of pan and tilt head 22, there is provided the aforementioned remote control unit 26, a portion of which is shown in FIGURES 9–14 inclusive. Unit 26 shown in FIGURE 1 comprises an on-off switch 26a for controlling the application of electrical power from a source thereof to unit 26. Also included therein is a switch 26b for selecting either automatic or manual operation as desired, and control devices 26c and 26d for controlling the pan and tilt movements respectively.

A control lever or stick 210 is movable positioned on unit 26 and is part of the sub-assembly shown in FIGURES 9–14 inclusive. Such sub-assembly comprises a base 200 on which is mounted in inverted position, a generally U-shaped bracket 202 by means of bolts 204. Bracket 202 is formed with a central through opening 202a wherein is positioned by means of bolts 206 a flexible mount 208 having a flexible rubber portion 208a fixed to a metal retaining member 208b. Mount 208 carries a manually operable handle or lever 210 which is exposed on unit 26 and a contact actuating disk 212 within inverted U-shaped bracket 202. Due to the flexible rubber portion 208a of mount 208, the handle or stick 210 may be tilted in any direction as will hereinafter appear. Disk 212, of course, is operatively associated with handle 210 and hence is caused to be tilted thereby in accordance with manipulation of such handle.

Mounted on base 200 are four angular brackets 214 each of which carries a switch member 216. Brackets 214 are so disposed on base member 200 as to position the four switches 216 at 90 degree positions about handle 210. With this arrangement, it is possible to move handle 210 so as to actuate any one of the four switches 216, or any adjacent pair thereof as will hereinafter become more apparent. As will be readily apparent to most persons skilled in the art, lever 210 functionally resembles the control stick employed in many early day aircraft. It is preferable to employ switches 216 which can be readily operated with little force and with little movement of the switch actuator. Such switches are commonly referred to in the art as microswitches.

Referring to FIGURE 12 of the drawings, it is seen that the right and left switches 216 are in circuit with panning motor 56, whereas up and down switches 216 are connected in circuit with tilt motor 58. Thus, by suitable manipulation of handle 210, it is possible to close the appropriate switch 216 or pair thereof so as to effect suitable movement of pan and tilt head 22. That is, if upswitch 216 is closed, current will be fed to the armature of motor 58 such as to cause the worm gear 80 to rotate gear member 90 on shaft 82 so as to tilt platform 100 in an upward direction. Conversely, if down switch 216 is closed by appropriate manipulation of handle 210, the armature of motor 58 is energized in the reverse direction thereby causing platform 100 to be tilted downwardly. As will be readily understood by those persons skilled in the art, the same explanation pertains to the effect of left and right switches 216 on the operation of pan motor 56.

It should be realized that due to the universal freedom of movement of lever 210 and actuating disk 212, it is possible to simultaneously close any two adjacent switches 216 to thereby effect a compound movement of the pan and tilt head 22. That is, if the handle 210 is pushed upwardly and to the right, the up and right switches 216 will be closed thereby effecting suitable energization of both motors 58 and 56 so as to cause the head 22 to move to the right while the platform 100 is being tilted upwardly. As will be readily apparent to those persons skilled in the art, corresponding compound movement of the pan and tilt head 22 results from simultaneous closure of any other pair of adjacent switches 116.

FIGURES 13 and 14 show alternate embodiments for the construction and operation of remote control unit 22. FIGURE 13 shows a configuration wherein a three step switch 220 is employed in place of each microswitch 216 of the embodiment shown in FIGURES 9–12 inclusive. Each switch 220 is so constructed that the contact members 220a, 220b and 220c are connected together such that contact 220a has the shortest distance to move to effect circuit controlling operation whereas contact 220c has the greatest distance to move to perform its intended function. Connected in circuit between contacts 220a and 220b and between the contacts 220b and 220c are current limiting resistors 222 and 224 respectively. Referring back to FIGURE 12 of the drawings, it is seen that by replacing the switches 116 in the control circuits for motors 56 and 58 with the switches 220 of FIGURE 13, the current limiting resistors 222 and 224 are effective to vary the speed of the respective motor. That is, as the actuating lever 210 is manipulated to actuate a given one of the switches 220, it firstly causes the contact 220a thereof to be closed so as to connect both of the current limiting resistors 222 and 224 in series with the particular motor. As the lever 210 is moved further, it causes the contact 220b thereof to be closed thereby shorting out the respective resistor 222 so as to permit greater current flow to the motor. In like fashion as the lever 210 is moved to its extreme position the contact 220c of the particular step switch 220 is closed thereby shorting out both of the resistors 222 and 224. In this manner, the speed of the motors 56 and 58 can be controlled in accordance with the extent of movement of the control lever 210 of the remotely located unit 26.

The embodiment shown in FIGURE 14 of the drawings contemplates the use of variable resistors or rheostats 230 mounted on platform 200 at the 90 degree positions corresponding to the placement of switches 216. Each such rheostat 230 comprises a resistance element 230a and a shorting contact or bar 230b, each of the latter of which is positioned adjacent disk 212 for operation by lever 210. Thus, as lever 210 is moved in a given direction, the shorting bar 230b of the appropriate rheostat 230 is moved so as to vary the amount of current supplied to the respective operating motor. It is contemplated that a greater amount of current will be afforded to the respective motor as the operating lever is moved further from its central position.

It is thus seen that whereas the embodiment disclosed in FIGURES 9–12 inclusive affords only on-off control for the motors 56 and 58, the embodiments of FIGURES 13 and 14 are capable of affording either stepped control or continuous modulation as desired. However, as above explained with reference to the first embodiment, the embodiments of FIGURES 13 and 14 can be manipulated so that any adjacent pair of switches or rheostats can be simultaneously actuated so as to provide compound movement of the pan and tilt head 22.

Mounted on platform 100 by screws 302 is a generally U-shaped mounting bracket 304. Within mounting bracket 304 is positioned a camera housing 306, there being interlocking clamping members 308 and 310 fastened respectively to housing 306 and mounting bracket 304. Member 308 may be welded to the side panels of housing 306 whereas member 310 is adjustably mounted on bracket 304 by any desired means as, for instance, a finger operated fastening device 312. It should be realized that such interlocking clamping members are provided at several positions on either side of housing 306 to firmly anchor the latter on mounting bracket 304.

Housing 306 is further provided with a detachable cover 306a which is removable to permit installation or replacement of the camera means within housing 306 as will hereinafter become more apparent. Cover 306a is provided with a plurality of clamping devices 314 which are located at several positions about the cover and are operable to firmly retain it in assembled position on housing 306. Clamping brackets 314 include finger operated fastening means 314a for facilitating removal of the cover without the need for additional tools.

As shown most clearly in FIGURE 1, cover 306a is formed with an overhanging forward portion to provide a shield for rain, dirt or other foreign materials which may fall on the scanning apparatus. To further assist in this function, the overhanging portion is provided with an upturned forward edge for causing the foreign material to be carried toward the rear of the housing.

Such overhanging portion of cover 306a protects the window 306b in housing 306 which may be formed of glass or plastic materials in accordance with the particular application. Such window is sealingly mounted within the forward end wall of housing 306 to prevent the ingress of moisture, dirt or other foreign materials while permitting the camera to operate effectively. For removal of rain and the like from window 306b, there is provided a wiper mechanism 316 which includes a resilient scraping member engageable with window 306b and movable thereon by means of an electrical motor positioned within housing 306.

To further adapt the scanning apparatus to varying environmental conditions, the housing 306 is provided with blower means which is operable to provide a frequent change of air within housing 306. That is, the television camera normally employed within housing 306a is electrically operated and tends to generate a certain amount of heat. Since there is a predetermined safe limit of operating temperature for such cameras, it is desirable to control the atmosphere wherein the camera is located. To accomplish this, one of the side walls of housing 306 is formed with an inlet opening and an outlet opening, over each of which is mounted suitable filter holder. Referring to FIGURE 1 of the drawings, numeral 320 designates the intake filter holder which is positioned over the air intake opening by means of finger operated screws 322. In like manner, a filter holder 324 is positioned over the outlet opening 306c in housing 306 and is held in assembled relation by finger operated screws 326. Within filter holders 320 and 324 is removably positioned suitable insulating material for removing dust and the like from the air as the latter is passed therethrough.

It is also contemplated that suitable thermostatic means will be employed within housing 306 for control of the blower motor in maintaining the temperature therewithin between certain predetermined safe limits. In this manner, the environmental conditions for the camera are at all times controlled.

The camera is mounted within housing 306 on an adjustable track as shown most clearly in FIGURE 15. The camera therein is represented by the rectangle 330. It is shown attached by means of a thumb screw 332 to an adjustable platform 334 having downturned opposite edges 334a and 334b. Mounting bracket 334 is adjustable positioned on a bracket member 336, the latter of which is formed with upturned opposite edges 336a and 336b. As shown, edge 334a of mounting platform 334 is bent slightly more than 90 degrees from the horizontal portion of platform 334. In corresponding fashion, upturned portion 336a of mounting bracket 336 is turned up slightly less than 90 degrees. On the other hand, edge 334b of platform 334 and edge 336b of mounting bracket 336 are disposed at substantially right angles to the horizontal.

Suitable fastening means in the form of a finger operated adjustment screw 338 threadedly mounted in downturned edge portion 334b and engageable with upturned portion 336b is provided as shown in FIGURE 15. Mounting bracket 336 is attached to the bottom wall of housing 306 in any desired manner as by welding, brazing, soldering or the like. Due to this arrangement, the longitudinal position of camera 330 can be varied as desired merely by loosening adjustment screw 338 and moving the mounting platform 334 relative to mounting bracket 336. Thereafter, tightening of adjusting screw 38 will retain camera 30 in the selected position.

Figure 16:
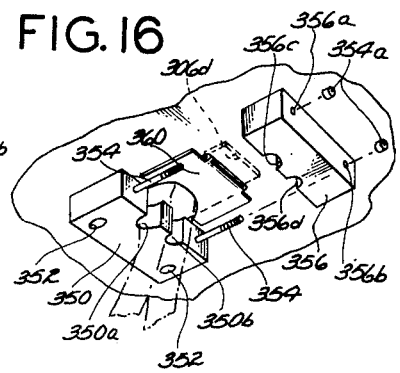
FIGURE 16 is an exploded perspective view of a cable fastening device employed in the housing of FIGURE 15.

At the rear of housing 306, in the bottom wall thereof, there is provided unique fastening means for receiving the electrical cables which are necessary for operating the camera and associated equipment, and for transmitting the information to a predetermined central location. As shown in FIGURE 16, this mounting means comprises a stationary block 350 which is firmly fastened to the underside of the bottom wall of housing 306 by screws 352. Block 350 is formed with arcuately shaped cutouts 350a and 350b which conform to a portion of the shape of the cables which extend into housing 306. A pair of fastening studs 354 are mounted in stationary block 350.

A movable block 356 is provided for cooperation with stationary block 350, the former being formed with through openings 356a and 356b for receiving fastening studs 354. Movable block 356 is further formed with arcuately shaped cutouts 356c and 356d which cooperate with the cutouts 350a and 350b of stationary block 350 to provide cylindrical surfaces for firmly engaging the electrical cables. Fastening nuts 354a cooperate with studs 354 after block 356 has been mounted on stationary block 350 to firmly grip the cables.

To accommodate various sizes of cables through the bottom wall of a given housing 306, such bottom wall is formed with a square opening which is sufficiently large to conveniently pass the largest cables and their connectors which would be used with the particular housing. Such opening in the bottom wall is shown generally at 306d. A metal plate 360 is placed against the bottom wall of housing 306 in such a position to cover opening 306d adjacent the electrical cable. After this has been accomplished, the movable block 356 is positioned on stationary block 350, the plate 360 thus being held in place to close the opening 306d.

The foregoing arrangement, of course, not only provides the desired seal to prevent ingress of moisture, dirt or the like, but it also provides a firm mounting of the electrical cables so that a force applied thereto will not tend to break or disrupt the connection of such cables to the camera and other circuit components within the housing.

For further protection of camera 330 and the other instruments within housing 306, it may be desirable to provide a shroud 370 over the housing 306. To facilitate this, four brackets 372 are mounted on U-shaped bracket 304 by welding, soldering or the like. Each of these brackets is provided with an L-shaped positioning member 374 and a clamping member 376.

Shroud 370 is formed of sheet metal and is substantially U-shaped in cross section as shown in FIGURE 15. It is provided with four clamping members 378 each of which includes a finger operated screw 378a and a clamping member 378b for engagement with a clamping member 376 on bracket 372. The opposite side walls of shroud 370 are provided with adjustable positioning screws 380 each of which carries fastening nuts 380a and 380b on opposite sides of shroud 370 to facilitate positioning of screw 380. Due to this arrangement, the shroud 370 can be positioned on housing 306 and spaced therefrom an equal distance thereabout. To aid in accomplishing this, the lower end portions of shroud 370 are positioned against the L-shaped positioning member 374 on the brackets 372. In this manner, an air space can be provided about housing 306 for insulating the instruments there within from certain environmental conditions such as intense solar heat and the like. As seen most clearly in FIGURE 1, shroud 370 is also provided with an overhanging forward portion having an upturned forward edge for insuring the removal of foreign materials while protecting the window 306b of housing 306.

Figure 17:
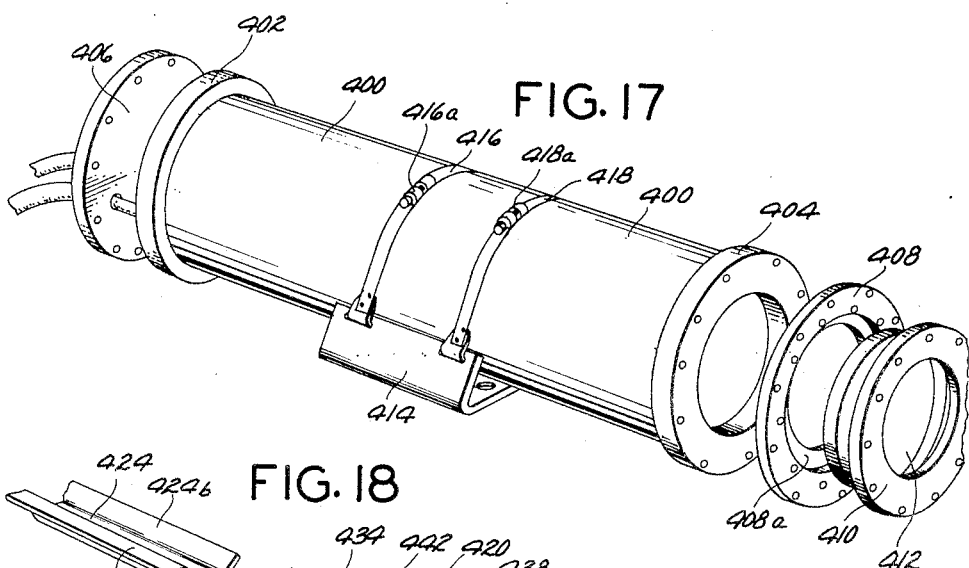
FIGURE 17 is an exploded perspective view of an explosion-proof housing for use with the pan and tilt head.
Figure 18:
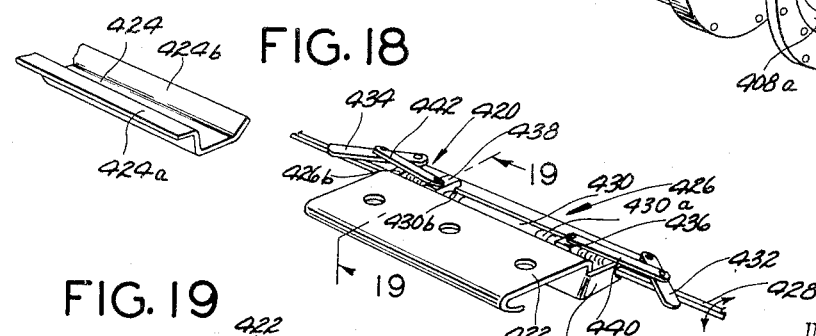
FIGURE 18 is an exploded perspective view of the mounting rack for the housing of FIGURE 17.
Figure 19:
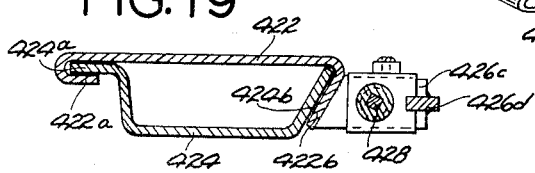
FIGURE 19 is a sectional view taken substantially along line 19—19 of FIGURE 18.

Referring to FIGURES 17–19 inclusive, there is shown therein another form of housing for mounting the camera on pan and tilt head 22. This embodiment is intended for use in high physical impact areas and hence is provided with characteristics making it explosion-proof. Such housing is formed of a thick-walled tubular member 400 to the opposite ends of which are attached annular flanges 402 and 404. Housing member 400 is preferably formed out of a section of steel pipe which has a wall of substantial thickness. The flanges 402 and 404 may be fastened to member 400 by any desired means such as by welding or the like.

A rear end wall 406 formed of steel of substantial thickness is fastened to flange 402 of housing 400 by a plurality of bolts (not shown). End wall 406 is formed with a through opening which is provided with appropriate fastening means for receiving the appropriate electrical cables for operation of the television camera and other equipment to be mounted within housing 400.

The forward end of housing 400 is provided with a removable flange member 408 which is fastened to stationary flange 404 by bolts (not shown). Removable flange 408 is formed with an annular cutout or recess 408a, there being an end wall member 410 positioned within member 408 by means of suitable fastening bolts. End wall member 410 is provided with a transparent window 412 which may be formed of appropriate transparent material which provides the necessary strength for the particular application.

Tubular member 400 of the explosion-proof housing is rigidly mounted on a mounting bracket 414 by straps 416 and 418 which may be formed of sheet steel or the like. The opposite ends of straps 416 and 418 are fastened to mounting bracket 414, while fastening devices 416a and 418a are included in the straps to afford high mechanical advantage for firmly mounting the housing on bracket 414.

FIGURES 18 and 19 disclose an additional form of adjustable mounting means for positioning a camera within a housing. This mounting means is particularly well adapted for use in the explosion-proof housing shown in FIGURE 17 since it permits the camera to be rigidly secured in place in spite of the minimum access into the tubular body member.

Such mounting means comprises an elongated mounting bracket 420 which carries the camera by means including the mounting holes formed in plate 422. Plate 422 is provided with a reversely bent edge as at 422a and an opposite edge which is formed as shown at 422b.

As shown most clearly in FIGURE 19, mounting plate 422 is positioned on a bracket 424 which is securely fastened within housing 400 by welding or the like. Bracket 424 is generally U-shaped and is provided with an elongated flange portion 424a for insertion within the reversely bent flange portion 422a of mounting plate 422. Also, bracket 424 is formed with an angularly offset upstanding edge 424b which cooperates with edge 422b of mounting plate 422 to hold the latter in assembled position as shown in FIGURE 19. It is believed readily apparent from FIGURES 18 and 19 that the mounting plate 422 and the television camera mounted thereon may be moved longitudinally within housing 400 while being restricted from lateral movement.

To securely fasten the mounting bracket 422 in place, mounting means 420 is provided with clamping means 426 which can be remotely operated. Clamping means 426 comprises a pair of bracket arms 426a and 426b each of which is welded to plate 422 and to a side member 426c which carries a substantially horizontally disposed guide member 426d. Each of the end brackets 426a and 426b is provided with an opening through which a rotatable adjusting rod 428 extends. Rod 428 is provided with a substantially square cross-section at either end and a substantially cylindrical central portion 430 having threaded portions 430a and 430b. Such threaded portions are provided with fastening threads of opposite hand for operation as will hereinafter become apparent.

At either end of plate 422 is a pivotal lever as shown at 432 and 434. Each of these levers is mounted relative to end brackets 426a and 426b for pivotal movement into and out of obstructing engagement with mounting bracket 424.

For operation of the pivotal levers 432 and 434, there is provided a block 436 on threaded portion 430a of rod 430 and a similar block 438 on threaded portion 430b thereof. Each of the blocks 436 and 438 is further provided with a horizontal disposed slot or cutout for slidably receiving guide member 426d. Due to this arrangement, as shaft 430 is rotated, as for instance by rotation of either end thereof, the blocks 436 and 438 are caused to move longitudinally due to the restriction against pivotal movement thereof as a result of the engagement of such slots with guide member 426d. Since the threaded portions 430a and 430b are of opposite hand, it is seen that as rod 430 is rotated in a given direction blocks 436 and 438 simultaneously move toward each other or away from each other as the case may be.

A lever 440, one end of which is pivotally fixed to block 436, is attached to pivotal lever 432 near the midpoint. In like manner, there is provided another lever arm 442 pivotally mounted on block 438 and connected to lever 434. Due to this arrangement, as blocks 436 and 438 are caused to move under the influence of shaft 430, the levers 432 and 434 are pivotally moved into or out of an obstructing position with respect to platform member 422 on mounting bracket 424.

Due to the above-described structure, after the camera is mounted on mounting plate 422 the latter is inserted into housing 400 through an open end thereof, the mounting plate 422 being longitudinally slid onto the mounting bracket 424. To retain the camera in a selected position, it is merely necessary to rotate shaft 430 such that blocks 436 and 438 move in a direction to cause lever arms 432 and 434 to contact mounting bracket 424. This operation, of course, can be conveniently performed by the use of any suitable wrench or tool which conveniently engages or grips the square cross-section 428 of rod 430.

It is thus seen that this invention provides scanning apparatus which may be located at a remote location or at a point which is wholly inaccessible to human beings. It can be operated automatically to provide constant surveillance of a given area, the television camera within the housing constantly transmitting the visual information to a predetermined central location. Further, the present invention teaches the construction of housing means for a remotely located camera such as to withstand substantially all environmental conditions. Such conditions may include high physical impact as for instance in explosion areas.

Although I have shown and described certain specific embodiments of my invention, I am fully aware that many modifications thereof are possible. The invention it-

I claim:

1. Panning and tilting apparatus for mounting camera scanning equipment or the like, said apparatus comprising:

a weatherproof housing;

a base member below said housing and having a portion located within said housing;

a horizontally oriented pan gear located in said housing and fixed to said base member;

a reversible electric pan motor and a reversible electric tilt motor secured to said housing within the interior thereof;

a platform for mounting scanning equipment or the like;

a horizontally oriented shaft fixedly mounting said platform and extending through said housing, said shaft being mounted to said housing for rotation about a horizontal axis;

a vertically oriented tilt gear located in said housing and fixed to said shaft for rotation therewith;

a pan worm gear located in said housing, meshed with said pan gear, and coupled to the output of said pan motor;

a tilt worm gear located in said housing, meshed with said tilt gear, and coupled to the output of said tilt motor;

a pair of pan limit switches and a pair of pan limit stops therefor mounted to said base member and said housing, said pan limit switches being in electrical circuit with said pan motor, one of said switches being actuatable by one of said stops after a predetermined panning of said housing in one direction relative to said base member and the other of said switches being actuatable by the other of said stops after a predetermined panning of said housing in the opposite direction relative to said base member, the relative positions of said switches and said stops being adjustable to adjust the extent of said predetermined panning in either direction;

a pair of tilt limit switches and a tilt limit stop therefor mounted to said housing and said shaft, said tilt limit switches being in electrical circuit with said tilt motor, one of said switches being actuatable by said tilt limit stop after a predetermined tilting of said platform in one direction relative to said housing, and the other of said tilt limit switches being actuatable by said tilt limit stop after a predetermined tilting of said platform in the opposite direction relative to said housing, the relative positions of said tilt limit stop and said tilt limit switches being adjustable to adjust the extent of said predetermined tilting in either direction;

and remotely located control means electrically coupled to said pan and tilt motors and to said pan limit switches and said tilt limit switches and responsive to actuation of either of said pan limit switches to stop said pan motor and responsive to actuation of either of said tilt limit switches to stop said tilt motor, said control means including a manually operable control element and four control switches disposed about said element in substantially equally spaced relationship, said control switches being in electrical circuit with said pan and tilt motors whereby movement of said control element in one direction operates one of said control switches to effect rotation of said tilt motor in one direction and movement of said control element in the opposite direction operates the opposite one of said control switches to effect rotation of said tilt motor in the opposite direction, and whereby the remaining pair of control switches are similarly operable by said control element to effect rotation of said pan motor in opposite directions, said remotely located control means also including means operable independently of said control element in circuit with said pan motor and said pan limit switches for automatically reversing the rotation of said pan motor each time one of said pan limit switches is engaged by one of said pan limit stops.

2. Apparatus as set forth in claim 1 wherein the four control switches of said remotely located control means each include ap lurality of switch and contact elements in circuit with resistor means and arranged to increase the speed of said pan and tilt motors in accordance with the extent of movement of said manually operable control element.

3. Apparatus as set forth in claim 1 wherein the four control switches of said remotely located control means each include a rheostat arranged to increase the speed of said pan and tilt motors in accordance with the extent of movement of said manually operable control element.

References Cited by the Examiner

UNITED STATES PATENTS

| | | | |
|---|---|---|---|
| 1,898,185 | 2/33 | Howell. | |
| 2,306,862 | 12/42 | Bown. | |
| 2,516,069 | 7/50 | Newhouse et al. | |
| 2,648,252 | 8/53 | Stancliff et al. | 88—16 |
| 2,760,417 | 8/56 | Laval | 95—11 |
| 2,929,667 | 3/60 | Jackson | 178—7.9 |
| 2,939,332 | 6/60 | Peterson | 74—471 |
| 2,969,268 | 1/61 | Mason et al. | 178—7.9 |
| 2,978,922 | 4/61 | Peterson | 74—471 |
| 3,012,488 | 12/61 | Callender | 95—11 |
| 3,019,695 | 2/62 | Douglas | 88—16 |

NORTON ANSHER, *Primary Examiner.*

WILLIAM MISIEK, *Examiner.*